United States Patent [19]

Fassbinder

[11] Patent Number: 5,191,802
[45] Date of Patent: Mar. 9, 1993

[54] DEVICE FOR MEASURING MASS FLOW

[75] Inventor: Hans-Georg Fassbinder, Sulzbach-Rosenberg, Fed. Rep. of Germany

[73] Assignee: Applikations und Technikzentrum für Energieverfahrens, Umwelt und Strömungstechnik, Sulzbach-Rosenberg, Fed. Rep. of Germany

[21] Appl. No.: 753,351

[22] Filed: Aug. 30, 1991

[30] Foreign Application Priority Data

Sep. 4, 1990 [DE] Fed. Rep. of Germany ........ 4028141

[51] Int. Cl.⁵ ............................................. G01F 1/82
[52] U.S. Cl. .................................................. 73/861.37
[58] Field of Search ........................ 73/861.37, 861.38; 384/461

[56] References Cited

U.S. PATENT DOCUMENTS

| | | | |
|---|---|---|---|
| 2,771,773 | 11/1956 | Wallace | 73/861.38 |
| 2,983,556 | 5/1961 | Coan | 384/448 |
| 4,133,587 | 1/1979 | Kume | 384/461 |
| 4,700,578 | 10/1987 | Fassbinder | 73/861.37 |

FOREIGN PATENT DOCUMENTS 3507993 8/1987 Fed. Rep. of Germany.

Primary Examiner—Herbert Goldstein
Assistant Examiner—R. L. Biegel
Attorney, Agent, or Firm—Spencer, Frank & Schneider

[57] ABSTRACT

An apparatus for measuring the flow rate of a stream of material includes an impeller shaft; an impeller wheel secured to the impeller shaft; a first roller bearing having an inner race receiving and supporting the impeller shaft; a drive motor having an output shaft; a first gear secured to the output shaft; a second gear secured to the impeller shaft; and a third gear meshing with the first and second gears, whereby the drive motor is drivingly connected to the impeller shaft by the first, second and third gears for rotating the impeller shaft with a predetermined rpm. The stream of material is directed onto the impeller wheel, whereby a braking torque is applied to the impeller wheel by the stream of material impinging thereon. There are further provided a force measuring device operatively coupled to the third gear; a second roller bearing receiving and rotatably supporting the outer race of the first roller bearing; and a drive for rotating the outer race with an rpm which is at least identical to the rpm of the impeller shaft.

4 Claims, 1 Drawing Sheet

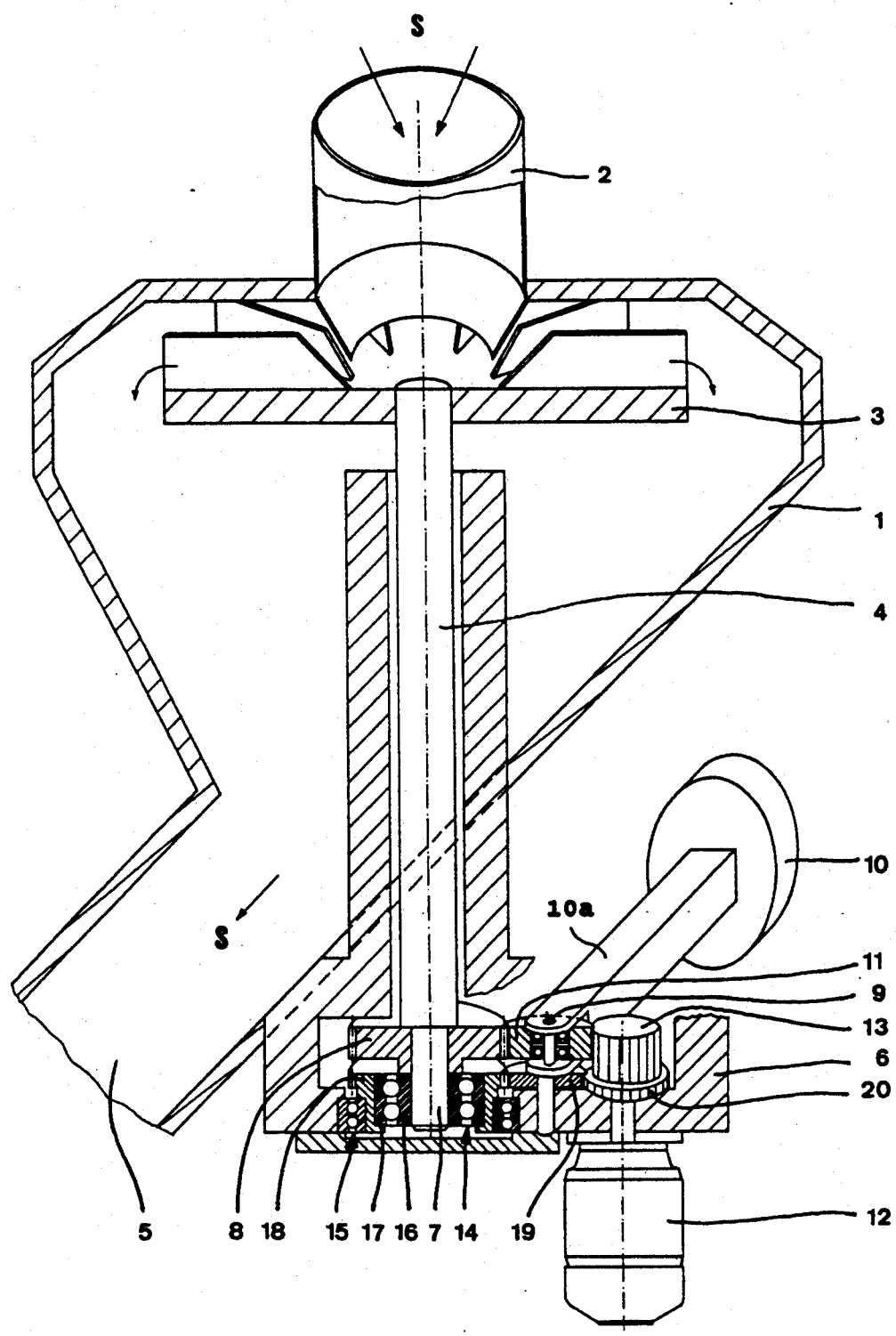

DEVICE FOR MEASURING MASS FLOW

CROSS-REFERENCE TO RELATED APPLICATION

This application claims the priority of application Ser. No. P 40 28 141.8, filed Sep. 4, 1990, in the Federal Republic of Germany, the subject matter of which is incorporated herein by reference.

BACKGROUND OF THE INVENTION

The present invention relates to a device for measuring the rate of flow of a preferably multi-phase stream. The device conventionally has a shaft-mounted impeller wheel which is driven with a constant rpm and on which the flowing mass axially impinges. The impeller wheel deflects the flowing mass and imparts thereto a radial and an axial velocity component. The shaft of the impeller wheel carries a driving spur gear which meshes with an intermediate spur gear held stationarily by a force measuring device. The intermediate spur gear also meshes—diametrically opposite from the driving spur gear—with a driven spur gear rotated by a drive motor.

Such devices are employed for measuring the throughput of bulk material, particularly powdered or fine-grained substances. The bulk material is guided axially onto the impeller wheel having radially oriented guide vanes, and the driving torque of the synchronous motor is measured. A change in the torque caused by the deflection of the axially introduced bulk material is a direct measure for fluctuations in the stream of bulk material.

In all such devices, the main problem is to measure the driving or braking torque with sufficient accuracy and with particular consideration of the fact that the shaft of the rotating element is decelerated not only by the stream of bulk material but also by friction forces generated in the bearing of the drive shaft itself and also in the drive assembly of the measuring device. These friction forces change considerably upon fluctuations in temperature since the viscosity of the lubricants required for the shaft bearing changes.

German Pat. No. 3,507,993 discloses a compensation of interfering torques originating in the measuring device by mounting the intermediate shaft of a spur gear that drives the rotating element and is disposed in a carrier element so that it is pivotal about the drive shaft of the gear assembly which is coaxial with the rotating element. The pivotal movement of the intermediate shaft and the carrier element are limited by a force measuring device.

The prior art measuring device outlined above has been found satisfactory down to a measuring range for a bulk stream of 50 kg/min; for smaller mass streams the sensitivity of the measuring device was no longer sufficient.

SUMMARY OF THE INVENTION

It is an object of the present invention to increase the sensitivity of the measuring device and to thus make it usable for measuring smaller mass streams.

This object and others to become apparent as the specification progresses, are accomplished by the invention, according to which, briefly stated, the impeller wheel shaft is mounted in a roller bearing whose inner race supports the shaft and whose outer race is rotatably mounted in a further roller bearing and is driven by an additional drive with an rpm that is at least equal to or greater than the rpm of the shaft.

With such a "driven bearing" for the impeller wheel shaft, a considerable percentage of the interfering torque is already compensated, particularly if the outer race of the bearing is driven at the same rpm as the shaft. In that case no relative movement occurs between the inner and outer races of the roller bearing supporting the shaft and the shaft is supported without friction with respect to the force measuring device.

Advantageously, the outer race of the roller bearing supporting the shaft is driven, through an intermediate spur gear, by a driving spur gear provided on the shaft of the drive motor. This construction for driving the roller bearing that supports the shaft corresponds to the construction of the spur gear drive of the shaft itself with, however, the intermediate spur gear being rotatably fastened on a shaft that is fixedly mounted in the drive housing.

As a further advantageous feature, the shaft of the intermediate gear is secured to the force measuring device so as to be laterally displaceable relative to the impeller shaft and to the shaft of the drive motor. The relationship between the force K applied to the force measuring device and the braking torque M applied to the impeller shaft is expressed by $K = 2M:R$, where R is the radius of the spur gear mounted on the impeller shaft. The formula indicates that K is the sum of two gear engagement forces $M:R$ of equal magnitude from two oppositely disposed gear engagement locations, that is, between the spur gear and the driving spur gear of the impeller shaft, on the one hand, and the intermediate gear and the driven spur gear of the drive motor, on the other hand. In this way, the measurement signal is doubled while in the device disclosed in German Pat. No. 3,507,993 it is cut in half.

BRIEF DESCRIPTION OF THE DRAWING

The sole FIGURE is an axial sectional view of a preferred embodiment of the invention.

DETAILED DESCRIPTION OF THE PREFERRED EMBODIMENT

The device for measuring a preferably multi-phase mass stream is essentially composed of a housing 1, for example a rotationally symmetrical housing, having an axial material entrance opening 2 below which a coaxial impeller wheel 3 is arranged to be rotatable on a vertical shaft 4 in the interior of the housing 1.

The stream of bulk material S flowing axially through entrance opening 2 into housing 1 and onto impeller wheel 3 is radially deflected on impeller wheel 3 and accelerated thereby in the radial as well as the tangential direction. The stream of bulk material thus applies to the shaft 4 a braking torque M which is directly proportional to the stream of bulk material and is used as a signal for the measurement of the flow rate of the stream of bulk material.

The bulk material ejected by impeller wheel 3 or dropping down is discharged from housing I through an outlet 5. The bulk material stream is measured with the aid of a spur gear drive disposed in a drive housing 6 and composed of a driving spur gear 8 that is fixed to the lower end 7 of shaft 4 which is likewise mounted in drive housing 6, an intermediate spur gear 11 whose shaft 9 is secured to an arm of a force measuring device 10, and a driven spur gear 13 provided on the shaft of a drive motor 12. A braking torque applied by the gear 8 on the gear 11 causes the gear 11 to "wander" and thus deflect the arm 10a of the force measuring device 10 which measures the deflecting force.

The lower end 7 of the shaft 4 is not mounted directly in a wall of spur gear housing 6 but through the intermediary of a roller bearing 14 which, in turn, is mounted in drive housing 6 by way of a second roller bearing 15.

The end 7 of shaft 4 is fixed to the inner race 16 of roller bearing 14; the outer race 17 of the roller bearing 14 is, in turn, fastened in roller bearing 15.

The outer race 17 of roller bearing 14 is provided with a toothed ring 18 which is driven by drive motor 12 with the intermediary of a driven spur gear 20 keyed to the shaft of drive motor 12 and a further intermediate spur gear 19 whose shaft is fixedly mounted in drive housing 6.

It is to be understood that it is feasible to provide, instead of the above-described spur gear arrangement, a drive by way of driven belts or a chain and possibly also by way of a further synchronous motor.

If the outer race 17 of roller bearing 14 is driven at the same rpm as shaft 4, no relative movement takes place between the inner race 16 and the outer race 17 of roller bearing 14 and shaft 4 is held without friction with respect to force measuring device 10. In this case, roller bearing 14 serves the purpose of permitting small swinging movements that are required to actuate force measuring device 10. These pivoting or swinging movements have a pivotal path of only a few angular degrees and are transmitted without friction by virtue of the above-described bearing arrangement. If the apparatus is running, roller bearing 14 is subjected to oscillations originating from the engagement of the teeth of the spur gears.

This arrangement precisely cancels the effect of the frictional torque of shaft 4 but not the frictional torque originating from the intermediate spur gear 11 of force measuring device 10. The frictional torque of intermediate spur gear 11 is, however, only very slight: it was found that in the arrangement described, the effect of the friction from the intermediate spur gear 11 on the output signal is less by a factor of 5 than that of shaft 4.

This error can be eliminated in a simple manner by selecting the drive for roller bearing 14 in such a way that the outer race 17 is driven at a slightly higher rpm than shaft 4. This increase in the rpm was determined experimentally and amounts to about 10% of the rpm of shaft 4.

The compensation of the friction influence realized in this manner has been found to be very stable. It was found to be particularly advantageous that each individual device need no longer be trimmed separately once the optimum increase in the number of revolutions had been determined.

It will be understood that the above description of the present invention is susceptible to various modifications, changes and adaptations, and the same are intended to be comprehended within the meaning and range of equivalents of the appended claims.

What is claimed is:

1. An apparatus for measuring the flow rate of a stream of material, comprising
   (a) an impeller shaft;
   (b) an impeller wheel secured to said impeller shaft;
   (c) a first roller bearing having an inner race receiving and supporting said impeller shaft; said first roller bearing having an outer race;
   (d) a drive motor having an output shaft;
   (e) a first gear secured to said output shaft;
   (f) a second gear secured to said impeller shaft;
   (g) a third gear meshing with said first and second gears, whereby said drive motor is drivingly connected to said impeller shaft by said first, second and third gears for rotating said impeller shaft with a predetermined rpm;
   (h) means for directing the stream of material onto said impeller wheel, whereby a braking torque is applied to the impeller wheel by the stream of material impinging thereon;
   (i) a force measuring device operatively coupled to said third gear for measuring excursions thereof in response to the braking torque;
   (j) a second roller bearing receiving and rotatably supporting the outer race of said first roller bearing; and
   (k) drive means for rotating said outer race with an rpm being greater than or equal to the rpm of the impeller shaft.

2. An apparatus as defined in claim 1, wherein said drive means for rotating said outer race of said first roller bearing comprises a gearing drivingly connected to said output shaft of said drive motor and said outer race of said first roller bearing.

3. An apparatus as defined in claim 2, wherein said gearing comprises
   (a) a fourth gear secured to said output shaft of said drive motor;
   (b) a fifth gear meshing with said fourth gear; and
   (c) a sixth gear secured to said outer race of said first roller bearing.

4. An apparatus as defined in claim 1, wherein said force measuring device includes a deflectable arm; further wherein said third gear has a gear shaft supported on said arm of said force measuring device ad further wherein $K = 2M:R$, wherein K is the force acting on the force measuring device, M is the braking torque and R is the radius of said second gear; said force being applied by said arm to said force measuring device upon deflection of said arm by a shifting displacement of the shaft of said third gear as said third gear wanders about said second gear when a braking torque is applied to said impeller shaft by said impeller wheel.

* * * * *